Dec. 9, 1958    J. E. EGBERT ET AL    2,864,066
TRANSDUCER
Filed Sept. 29, 1954

INVENTORS
John E. Egbert
John A. Maynard
BY R W Furlong
ATTY.

United States Patent Office 2,864,066
Patented Dec. 9, 1958

2,864,066

TRANSDUCER

John E. Egbert, Natick, and John A. Maynard, Winchester, Mass., assignors, by mesne assignments, to Minneapolis-Honeywell Regulator Company, a corporation of Delaware Application September 29, 1954, Serial No. 459,058

3 Claims. (Cl. 336—134)

This invention relates to an electro-mechanical transducer and pertains more specifically to a transducer capable of indicating the extent and direction of movement in two dimensions from a reference position.

One object of the present invention is to provide a transducer capable of indicating the extent and direction of displacement in two dimensions.

Another object is to provide a transducer for analyzing displacement in any direction in a plane into two vector components at right angles to each other, yielding a signal indicating the magnitude and direction of each vector component.

Still another object is to provide a transducer having two pairs of poles, each pair being disposed at right angles to the other, and a winding on each pole arranged to provide a magnetic flux instantaneously directed in alternately opposite directions in each adjacent pole when a current is passed through the winding, together with a single magnetizable member in spaced opposing relation to all of the poles.

Still a further object is to provide a bilateral rectilinear pick-off capable of analyzing two-dimensional movement in terms of vector components.

The invention will be further described with reference to the specific embodiments shown in the appended drawings, but it will be understood that these embodiments serve merely as illustrations of the invention and are not intended as limitations thereon.

For the sake of simplicity and clarity, the windings have been omitted from Figs. 2 to 7, but it will be understood that the arrangement of the windings is the same in each case.

Figure 1:
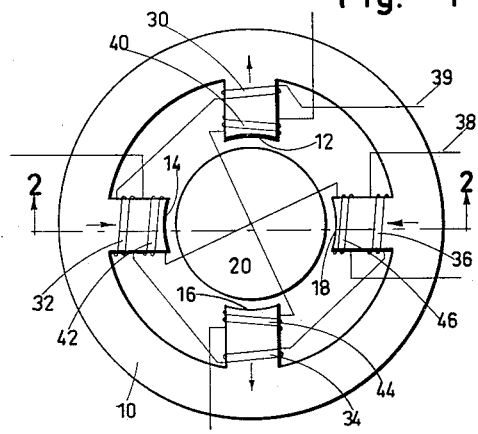
Fig. 1 is a diagrammatic plan view of one embodiment of the invention with the elements in the reference position and showing the arrangement of the windings.
Figure 2:
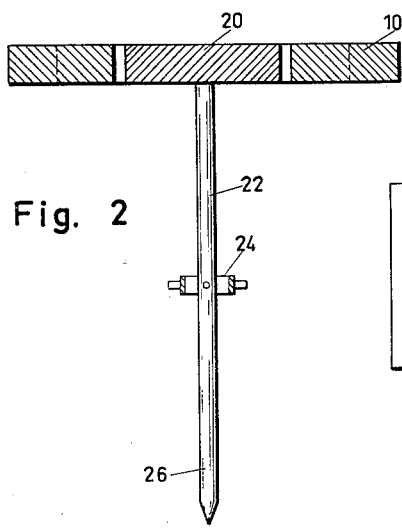
Fig. 2 is a vertical section of the embodiment shown in Fig. 1.

As shown in Figs. 1 and 2, the device includes a magnetizable member or core 10 having two pairs of opposing spaced poles 12, 14, 16, 18 and a second magnetizable member 20 mounted in spaced opposing relation to all four poles. As indicated in Fig. 2, core 10 may be fixed while member 20 is mounted on rod 22 pivoted on universal pivot 24. Extension 26 of rod 22 serves as a "feeler" or force delivering member. By making rod 22 and extension 26 sufficiently long with respect to the desired extent of displacement, any movement of the end of extension 26 and of member 20 will be substantially two-dimensional movement, member 20 being free to move in any direction in the general plane of core 10. While only a single mounting arrangement is shown, it will be understood that member 20 may be fixed and core 10 movably mounted for substantially planar movement with respect thereto, the essential consideration being that core 10 and member 20 are mounted for substantially planar movement with respect to each other.

Each pole of core 10 is provided with a winding 30, 32, 34, 36 which may be termed a primary winding, all of these windings being connected in series, so that when an alternating current is passed through leads 38, 39 from any suitable source (not shown), a magnetic flux will be produced in each pole. The primary windings on adjacent poles, such as 12 and 14, are turned in opposite directions, as shown in Fig. 1, so that the instantaneous flux direction in pole 12 is opposite the instantaneous flux direction in pole 14, the instantaneous flux direction in each pole being indicated by the arrows in Fig. 1. Similarly, instantaneous flux directions are opposite in any other two adjacent poles of the core, the flux being directed outwardly in one pair of opposing poles 12, 16 and inwardly in the remaining pair of opposing poles 14, 18. Since adjacent poles are magnetically connected by core 10 and the space between the free ends is bridged by the opposing movable magnetizable member 20, a closed path or loop of magnetic flux is set up in each quadrant of the device, as shown by the arrows in Fig. 2.

Each pole is also provided with a secondary or signal winding 40, 42, 44, 46. The signal windings 40 and 44 on opposing poles of a pair are connected in series opposition, while signal windings 42, 46 on the opposing poles of the remaining pair are likewise connected in series opposition, as shown in Fig. 1. Accordingly, when a magnetic flux is generated by passage of a current through the primary windings, the E. M. F. induced in each secondary or signal winding will oppose the induced E. M. F. in the signal winding on the opposing pole.

Since the magnetizable member 20 and core 10 are symmetrically disposed with respect to each other so that the air gaps at the ends of opposing poles 12 and 16 are equal to each other and the air gaps at the ends of the remaining pair of opposing poles 14 and 18 are also equal to each other when the members are in the reference or null position, and since all four primary windings are connected in series, the flux density in each quadrant of the device will be identical when the members are in the reference or null position. The E. M. F. induced in each signal winding will balance out the induced E. M. F. in the signal winding on the opposing pole, so that no signal will be obtained from either set of signal windings. Furthermore, since member 20 is cylindrical, rotation of this member with respect to core 10 about its axis produces no output signal from either set of signal windings, so that the device is insensitive to relative rotation of the parts.

Figure 3:
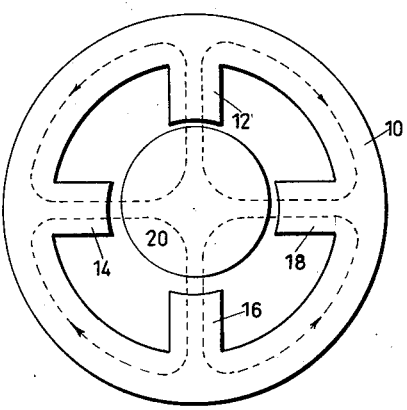
Figs. 3 and 4 are diagrammatic plan views showing a change in position of the elements from the reference position.

However, if member 20 is moved in the direction of pole 12, as shown in Fig. 3, the air gap at the end of pole 12 will be decreased and the air gap at the end of pole 16 will be increased, while the air gaps at the ends of poles 14 and 18 will remain substantially constant. Accordingly, the flux density in the two upper quadrants, as seen in Fig. 2, will be increased while the flux density in the two lower quadrants will be decreased. These changes in flux density balance each other so that the total flux passing through pole 18 will be the same as that passing through pole 14. The induced E. M. F. in signal winding 42 will balance that in signal winding 46 so that no signal will be obtained from these windings, indicating that no displacement toward or away from either of poles 14 or 18 has occurred. However, the flux density in pole 12 will be considerably greater than that in pole 16 so that the induced E. M. F. in signal winding 40 will be considerably greater than the induced E. M. F. in signal winding 44, providing a net signal from the terminals of this pair of signal windings. The amplitude of this signal bears a substantially linear relationship to the extent of displacement over distances up to 40 to 60% of the air gaps, so that by connecting a suitable meter to the secondary of the signal windings, the extent of displacement can readily be measured after calibration of the device. In addition, the direction of displacement (i. e., whether toward pole 12 or away from it) is also indicated by the phase of the net signal from the signal windings on opposing poles.

Figure 4:
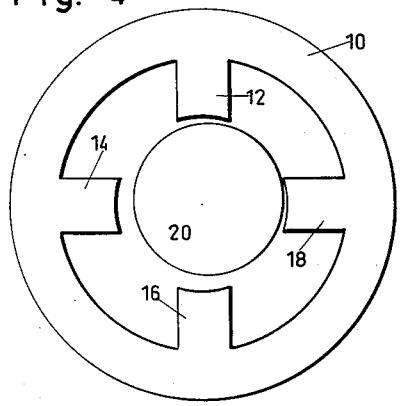

In the case where member 20, as shown in Fig. 4, moves in a direction intermediate poles 12 and 18, the air gaps in the ends of these two poles will be decreased, while the air gaps at the ends of the remaining two poles 14 and 16 will be increased. The flux density in the quadrant defined by poles 12 and 18 will be greatly increased, and the flux density in the quadrant defined by poles 14 and 16 will be greatly decreased. The flux density in the remaining two quadrants will remain approximately unchanged since the effect of the increase of one air gap in each of these quadrants is balanced out by the decrease of the other air gap in each quadrant. Accordingly, the total flux through signal windings 40 and 46 will be increased, while the total flux through signal windings 42 and 44 will be decreased. The induced E. M. F. in each signal winding 40 and 46 will exceed the E. M. F. induced in the signal winding on the respective opposing pole so that a net signal will be obtained from each set of signal windings, indicating by its phase and amplitude the extent of movement toward each of poles 12 and 18.

As will be apparent from the foregoing, the electrical signal obtained from each set of signal windings provides an indication of the amplitude and direction of displacement of member 20 with respect to core 10 as measured along the axes of each pair of opposing poles. When these pairs of poles are disposed at right angles to each other, which is the most convenient arrangement, the signals provide an analysis of the relative displacement of the members in terms of two vector components at right angles to each other.

Figure 5:
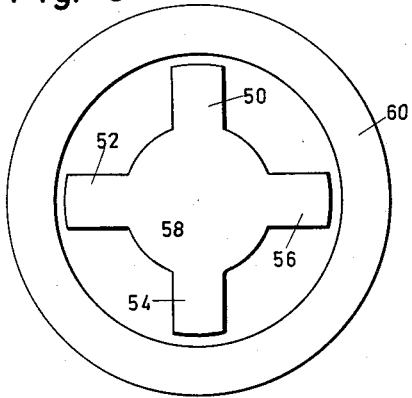
Figs. 5, 6 and 7 are diagrammatic plan views of other embodiments of the invention.
Figure 6:
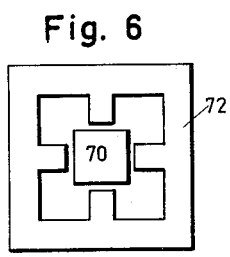
Figure 7:
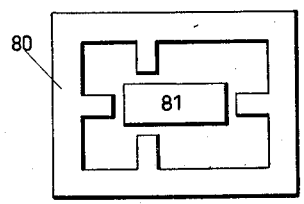

As shown in Figs. 5, 6 and 7, the device may take other geometric forms. Poles 50, 52, 54, 56 may be mounted on member 58, as shown in Fig. 5, with their free ends extending outwardly, and magnetizable member 60 may take the form of a ring or annulus which is in opposing spaced relation to all four of the poles, the windings on the poles being the same as indicated in Fig. 1. Relative movement of the two members 58 and 60 results in a signal as described above.

The two members need not be circular in section, but may take any suitable regular geometric form. As shown in Fig. 6, magnetizable member 70 may have the cross-section of a polygon such as a square, and core member 72 which carries the poles may likewise have a generally square configuration. It will be noted in the configuration shown in Fig. 6 that the air gaps at the ends of all four poles need not be exactly equal as in the case of the preferred embodiment shown in Fig. 1, but that the air gaps at the ends of opposing poles of a pair may be equal to each other although unequal to the air gaps at the ends of the poles of the remaining pair. In this case, however, the output signals from the two sets of signal windings will be different sensitivities.

As shown in Fig. 7, the free ends of the poles need not be equally spaced from each other as in the preferred embodiment, but instead may be mounted on a rectangular core 80, the space between the ends of the poles being bridged by means of a magnetizable member 81 likewise of rectangular cross-sectional shape.

It will be understood that the references to flux direction in the specification and claims in each case refer to instantaneous flux direction.

Although specific embodiments of the invention have been herein described, it is not intended to limit the invention solely thereto, but to include all of the obvious variations and modifications within the spirit and scope of the appended claims.

We claim:

1. An electro-mechanical transducer comprising a generally annular core having four radially inwardly extending spaced poles arranged 90° apart, a magnetizable member disposed within said core having a null position in which said member is symmetrically disposed in spaced relation to said poles, said core and said member being mounted for translational movement toward and away from each other to vary the spacing between said member and each said pole, a primary winding on each pole, all the primary windings being connected in series and arranged to provide a magnetic flux directed inwardly in one pair of opposing poles and outwardly in the remaining pair when a current is passed through the windings, and a secondary winding on each pole, the secondary winding on each pole being connected in series opposition with the secondary winding on the opposing pole.

2. A bilateral rectilinear pick-off for generating two electrical signals in response to mechanical displacement of said pick-off, the signals being proportional to the extent of displacement along two vectors intersecting at right angles, said pick-off comprising two magnetizable members, one of said members having two pairs of aligned poles, each pair being arranged at right angles to the other pair, said members being mounted in spaced relation one within the other for translational movement to and from a null position in which said second member is equally spaced from each aligned pole of a pair and a position in which said second member is unequally spaced from the aligned poles of at least one pair, a primary winding on each pole, all said primary windings being connected in series to provide a magnetic flux directed alternately in opposite directions in adjacent poles upon passage of a current therethrough, and a signal winding on each pole, the signal winding on each pole of a pair being connected in series opposition with the signal winding on the other aligned pole of said pair.

3. A bilateral rectilinear pick-off for generating two electrical signals in response to mechanical displacement of said pick-off, the signals being proportional to the extent of displacement along two vectors intersecting at right angles, said pick-off comprising a generally annular core having four radially inwardly extending symmetrically disposed poles, a magnetizable member centrally disposed within said core in symmetrical spaced relation to said poles, said members being mounted for translational movement toward and away from each other in any direction in the plane of said core, a primary winding on each core, all said primary windings being connected in series to provide a magnetic flux inwardly in two opposing poles and outwardly in the remaining two opposing poles, and a signal winding on each pole connected in series opposition with the signal winding on the opposing pole to provide an induced E. M. F. in each said winding which opposes the induced E. M. F. in the signal winding on the opposing pole.

References Cited in the file of this patent

UNITED STATES PATENTS

| | | |
|---|---|---|
| 1,988,458 | Minorsky | Jan. 22, 1935 |
| 2,488,734 | Mueller | Nov. 22, 1949 |
| 2,559,575 | Fryklund | July 3, 1951 |
| 2,790,119 | Konet | Apr. 23, 1957 |